United States Patent
Vajravel et al.

(10) Patent No.: US 12,299,478 B2
(45) Date of Patent: May 13, 2025

(54) MANAGING DEPENDENT CONTAINERS BASED ON CONTEXT

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 669 days.

(21) Appl. No.: 17/483,322

(22) Filed: Sep. 23, 2021

(65) Prior Publication Data

US 2023/0094177 A1    Mar. 30, 2023

(51) Int. Cl.
  *G06F 9/48*    (2006.01)
(52) U.S. Cl.
  CPC .................... *G06F 9/4856* (2013.01)
(58) Field of Classification Search
  CPC ................. G06F 9/4856; G06F 9/5048
  See application file for complete search history.

(56) References Cited

U.S. PATENT DOCUMENTS

| | | | |
|---|---|---|---|
| 11,113,090 B1* | 9/2021 | Wilkinson | G06F 9/5077 |
| 2008/0104605 A1* | 5/2008 | Steinder | G06F 9/5033 |
| | | | 718/104 |
| 2019/0121663 A1* | 4/2019 | Guo | G06F 9/45558 |
| 2019/0149617 A1* | 5/2019 | Gao | H04L 67/34 |
| | | | 709/223 |
| 2020/0341789 A1* | 10/2020 | Ghag | H04L 41/5058 |
| 2021/0089361 A1* | 3/2021 | Rafey | G06F 9/45558 |
| 2021/0109778 A1* | 4/2021 | Keating | A63F 13/48 |
| 2021/0191751 A1* | 6/2021 | Park | G06F 9/5077 |
| 2021/0349747 A1* | 11/2021 | Albasheir | G06F 11/302 |
| 2022/0368615 A1* | 11/2022 | Bhatnagar | H04L 41/0893 |

* cited by examiner

*Primary Examiner* — Lewis A Bullock, Jr.
*Assistant Examiner* — Carlos Alberto Espana
(74) *Attorney, Agent, or Firm* — Kirton McConkie; Brian Tucker (57) ABSTRACT

Dependent containers can be managed based on context. When an application is deployed in a container and relies on a service or other resource external to the container, context about the container, the application and any data paths the container may require can be monitored and used to calculate a container instance weight, an application weight and a data path weight. Such weights can then be used to calculate a per container weight which in turn can be used to determine if any changes in container type or location may be more optimal for an application. Such weights can also be used to calculate a per solution weight which in turn can be used to determine if any changes in container type or location may be more optimal for a solution.

14 Claims, 11 Drawing Sheets

| Container Type | Container Instance Weight Coeff. | | |
|---|---|---|---|
| | $a_1$ | $a_2$ | $a_3$ |
| Docker | 4 | 3 | 2 |
| Kata-Container | 7 | 5 | 4 |
| Hyper-V Win10 VM | 10 | 10 | 5 |
| Win10 Azure WVD | 10 | 2 | 8 |
| AWS ECS | 5 | 2 | 5 |
| ... | | | |

202

| Application | Application Weight Coeff. | |
|---|---|---|
| | $b_1$ | $b_2$ |
| Adobe Creative | 8 | 8 |
| Zoom | 7 | 5 |
| SSO Svc | 1 | 1 |
| NLP/S2Text Svc | 8 | 8 |
| GPU Lib | 7 | 7 |
| ... | | |

203

| Data Path Type | Data Path Weight Coeff. | |
|---|---|---|
| | $c_1$ | $c_2$ |
| Register based | 1 | 10 |
| DMA based | 4 | 8 |
| Network Based | 7 | 4 |
| ... | | |

204

| Formulae |
|---|
| Container instance weight $a = a_1(x_a) + a_2(y_a) + a_3(z_a)$ |
| Application weight $b = b_1(x_b) + b_2(y_b)$ |
| Data path weight $c = c_1(x_c) + c_2(y_c)$ |
| Per container weight $= a + b + \Sigma c_x$ |
| Per solution weight $= \Sigma a_x + \Sigma b_x + \Sigma c_x$ |

MANAGING DEPENDENT CONTAINERS BASED ON CONTEXT

CROSS-REFERENCE TO RELATED APPLICATIONS

N/A

BACKGROUND

Containerization in the software context refers to a technique for packaging an application and its dependencies into a container to abstract/isolate the application from the underlying host operating system and environment. A number of containerization techniques exist including software containers (e.g., Docker containers) and hardware containers (e.g., Hyper-V Docker containers), both of which may be deployed on an end user's computing device to host one or more applications or services. A browser tab may be considered a type of software container in that it isolates a web application from the host operating system. Additionally, software and hardware containers may be deployed in the cloud ("cloud containers") to host one or more applications or services that are made accessible to the end user's computing device (e.g., Word running on Azure Virtual Desktop).

Oftentimes, containerization will be employed to isolate each of a user's applications in a separate container. For example, each application may be deployed in a software container or a hardware container on the user's computing device or a browser-based version of the application may be employed. In such cases, the techniques described in U.S. patent application Ser. No. 17/391,993 (the '993 Application), which is incorporated by reference, may be used to allow the isolated applications to communicate with applications or services hosted outside their respective containers.

As one example, the techniques of the '993 Application may be leveraged to enable video editing software hosted in a hardware container on the user's computing device to use a speech-to-text engine that is running in a cloud container to detect inappropriate language in a video. Similarly, the techniques of the '993 Application may be leveraged to enable Zoom, when hosted in a software container on the user's computing device, to use the same speech-to-text engine to provide automatic captions.

As another example, the techniques of the '993 Application may be leveraged to enable a web application that is performing a simulation in a browser tab on the user's computing device to use a GPU service that is running in a hardware container. Similarly, the techniques of the '993 Application may be leveraged to enable a game that is hosted in a software container on the user's computing device to use the same GPU service.

As a further example, the techniques of the '993 Application may be leveraged to enable Word, when hosted in a cloud container, to access a storage aggregator service that is hosted in a software container deployed on the user's computing device to store and access files. Similarly, the techniques of the '993 Application may be leveraged to enable Adobe Photoshop, when hosted in a hardware container on the user's computing device, to use the same storage aggregator service to store and access files.

Accordingly, the techniques of the '993 Application enable at least the following "dependent container" scenarios: (1) a scenario where applications hosted in different containers on a user's computing device access the same cloud-based service; (2) a scenario where a web application and an application hosted in a container access the same service that is hosted in another container; and (3) a scenario where an application hosted in a cloud container and an application hosted in a container on a user's computing device access the same web-based or containerized service.

Applications may be selectively deployed in a particular type of container based on a number of factors such as preference and security. Also, techniques exist for migrating an application between container types such as those described in U.S. patent application Ser. No. 17/343,567 which is incorporated herein by reference.

With the ability to deploy applications in a variety of container types and migrate them between container types along with the variety of dependent container scenarios that could be created, it can be difficult to ensure that containerized applications are hosted in an optimal manner.

BRIEF SUMMARY

The present invention extends to systems, methods and computer program products for managing dependent containers based on context. When an application is deployed in a container and relies on a service or other resource external to the container, context about the container, the application and any data paths the container may require can be monitored and used to calculate a container instance weight, an application weight and a data path weight. Such weights can then be used to calculate a per container weight which in turn can be used to determine if any changes in container type or location may be more optimal for an application. Such weights can also be used to calculate a per solution weight which in turn can be used to determine if any changes in container type or location may be more optimal for a solution.

In some embodiments, the present invention may be implemented as a method for managing dependent containers based on context. While an application is deployed in a container, context may be gathered about one or more of the application, the container or one or data paths established for the container. The context may be used to calculate one or more weights. The one or more weights may be used to calculate a per container weight. Based on the per container weight, the application may be migrated to a different container.

In some embodiments, the present invention may be implemented as computer storage media storing computer executable instructions which when executed implement a method for managing dependent containers based on a context. A first container that hosts a first application can be identified. A container instance weight can be calculated for the first container, an application weight can be calculated for the first application and a data path weight can be calculated for a data path established for the first container. A per container weight can be calculated from the container instance weight, the application weight and the data path weight. It can then be determined from the per container weight that the first container is not optimal for the first application. The first application may then be migrated to a second container.

In some embodiments, the present invention may be implemented as a method for managing dependent containers based on context. A first container that hosts a first application can be identified. A first container instance weight can be calculated for the first container, a first application weight can be calculated for the first application and a first data path weight can be calculated for a data path established for the first container. A second container that hosts a second application can be identified. A second container instance weight can be calculated for the second container, a second application weight can be calculated for the second application and a second data path weight can be calculated for a data path established for the second container. A per solution weight can be calculated from the container instance weight, the application weight, the data path weight, the second container instance weight, the second application weight and the second data path weight. A solution that includes the first application and the second application can then be modified based on the per solution weight.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "computing device" should be construed as any computing device that is capable of executing an application within a container. Examples of computing devices include a desktop, laptop, thin client or tablet. The term "container" should be construed as encompassing, while not being limited to, the various examples of containers described in the background. A "dependent container" should be construed as a container that hosts an application which relies on a service (or other resource) hosted outside of the container. Therefore, a dependent container requires that a data path be established to enable the application to access the service. The term "solution" may be used to represent a dependent container scenario, and may particularly represent each dependent container, the shared service on which the dependent containers rely and each data path by which the dependent containers access the shared service.

Figure 1:
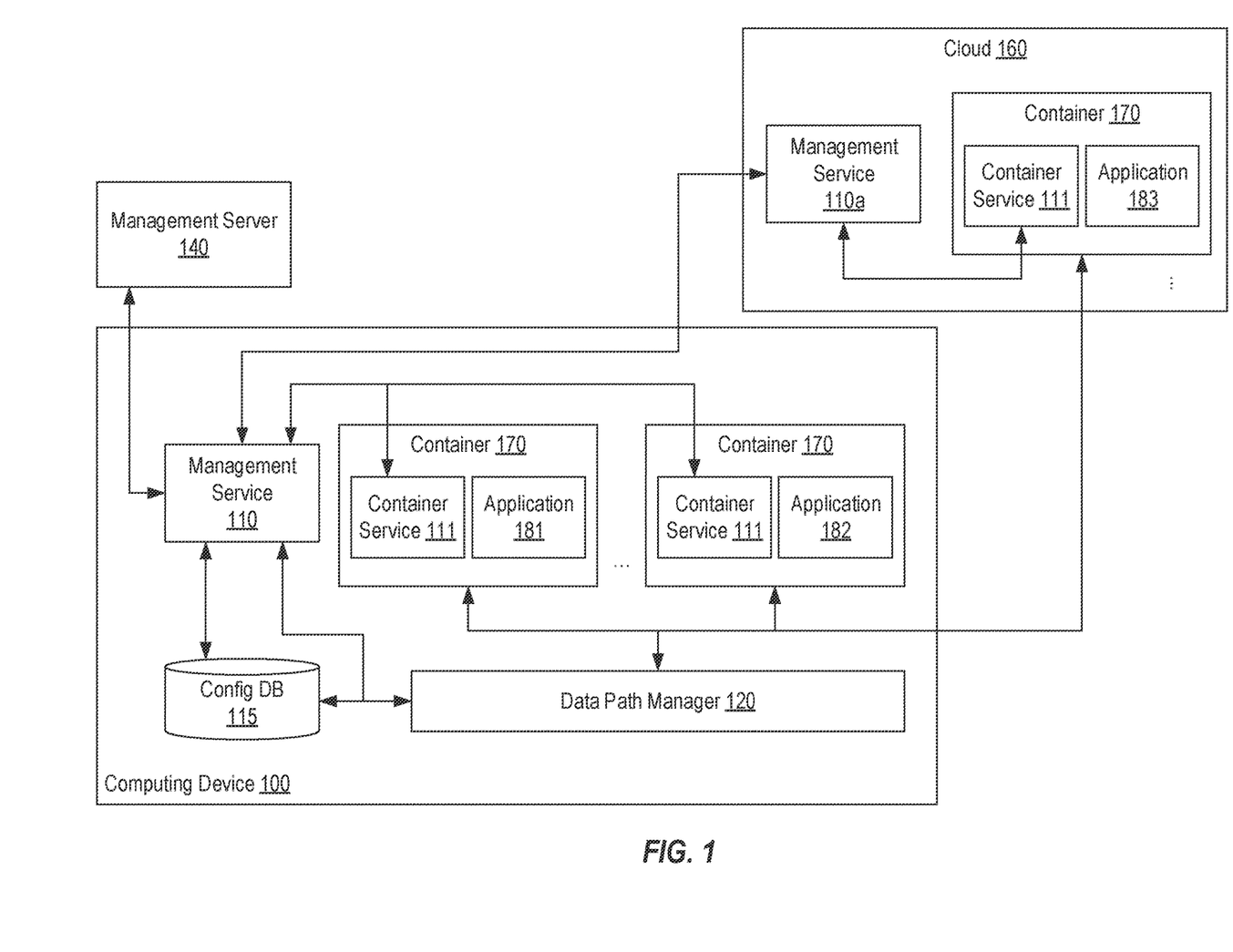
FIG. 1 provides an example of a computing environment in which one or more embodiments of the present invention may be implemented.

FIG. 1 provides an example of a computing environment in which embodiments of the present invention may be implemented. The computing environment employs containerization techniques to host applications that a user of computing device 100 may use. For example, containers 170 may be deployed on computing device 100 or in cloud 160. Each of containers 170 could be a software container or a hardware container and there could be any reasonable number of containers 170 hosting applications at any given time. For purposes of this example, it is assumed that applications 181 and 182 are hosted in separate containers 170 deployed on computing device 100 and application 183 is hosted in a container 170 deployed in cloud 160. Cloud 160 could represent Azure, AWS, etc.

A management service 110 can be deployed on computing device 100 to provide management functionality for containers 170 deployed on computing device 100. A similar management service 110a may coordinate with management service 110 to perform similar management functionality for containers 170 hosted in cloud 160. Therefore, in this description, some references to management service 110 can include management service 110a.

In some embodiments, management service 110 may interface with management server 140 to obtain configuration information and store it in configuration database 115. Management server 140 may employ such configuration information to manage containers 170, including to manage dependent containers based on context in accordance with one or more embodiments of the present invention.

Each container 170 can include an instance of container service 111. Management service 110 can be configured to detect when a container is deployed on computing device 100 or in cloud 160 and, in response, to establish a connection with the instance of container service 111 running in the container. As one example only, management service 110 and each instance of container service 111 can be configured to communicate with an external connection coordinator (not shown) to provide connection information (e.g., an IP address and port number). Management service 110 and container services 111 can then use the connection information to establish connections for communicating as described herein. However, management service 110 and container services 111 could use any suitable technique for communicating. Container service 111 may provide management service 110 with information about the application (or applications) hosted in the respective container 170 (e.g., the application name, a manifest file, an application state, the peripherals the application uses, resource consumption, etc.).

A data path manager 120 can be deployed on computing device 100 and can perform the functionality described in the '993 Application to create data paths for containers 170, or at least for those that are dependent containers. For example, as described in detail in the '993 Application, management service 110 can be configured to obtain or compile "configuration information" for containers that are or may be deployed on computing device 100. This configuration information can identify the containerized applications or services, whether they are consumers or providers, what their dependencies or exports are, the type of container in which they are deployed, etc. Using this configuration information, management service 110 can automatically create data paths between containers by which the instances of container service 111 running in the containers can intercommunicate for the purpose of providing a consumer containerized application with access to a provider containerized service in a separate container. Management service 110 may leverage data path manager 120 to establish such data paths.

As an overview, embodiments of the present invention may be implemented to manage dependent containers based on context. Management service 110 can be configured to identify dependent containers and their data paths and monitor corresponding state. Such context can then be used to determine whether a particular dependent container scenario should be optimized. In some cases, an application and/or service involved in a dependent container scenario may be automatically migrated to optimize the scenario.

Figure 2:
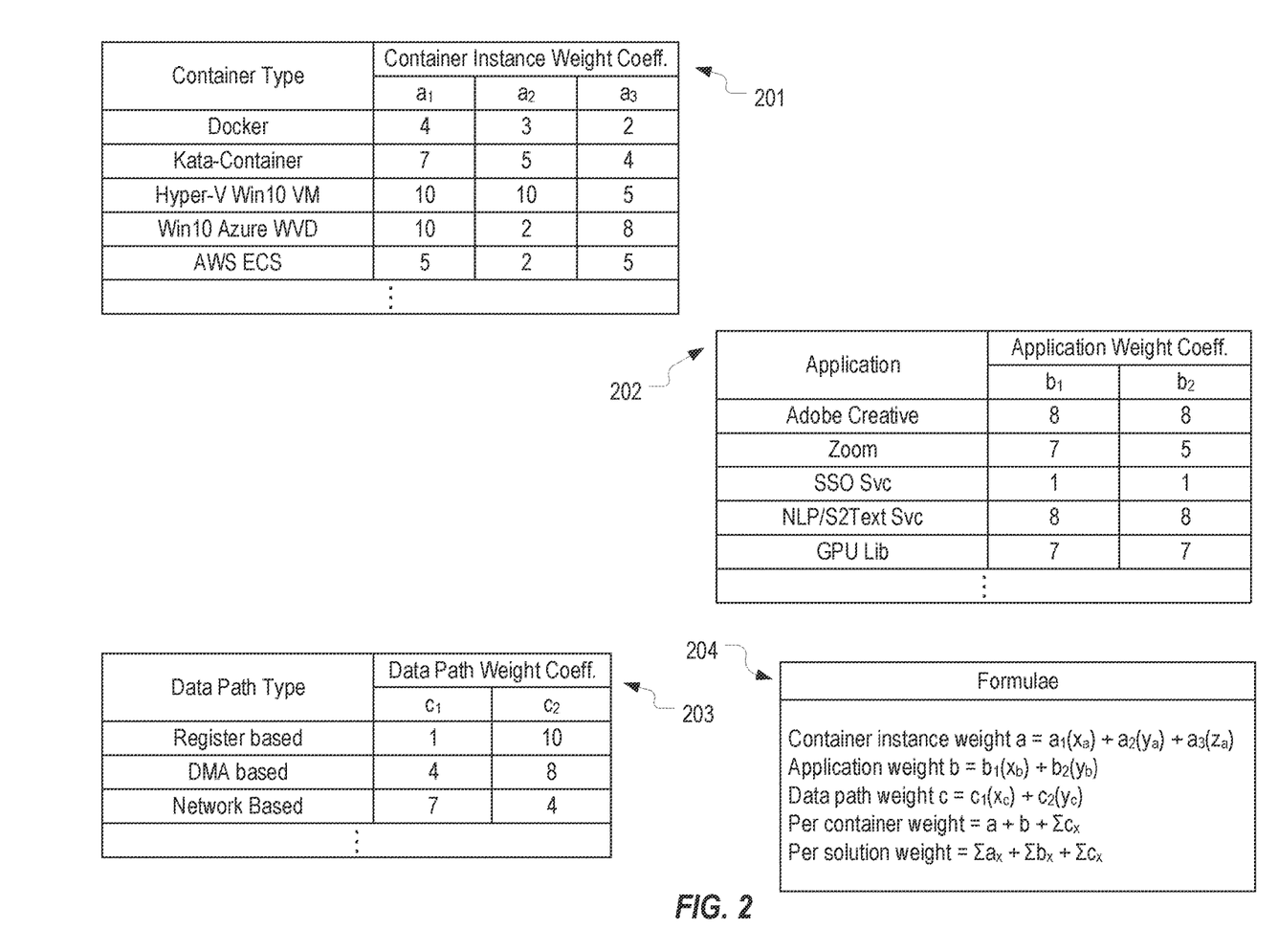
FIG. 2 provides an example of various data structures and formulae that could be used in one or more embodiments of the present invention.

FIG. 2 provides an example of various data structures and formulae that may be employed in one or more embodiments of the present invention to determine how to manage dependent containers. As described in greater detail below, formulae that employ various weights could be used to determine whether the container type and/or location of a container is optimal for a dependent container scenario. When the container type and/or location is not optimal, one or more applications or a shared service may be migrated to a different container type and/or location that is optimal for the dependent container scenario.

FIG. 2 includes a container instance weight coefficient table 201, an application weight coefficient table 202 and a data path weight coefficient table 203, each of which can be used to obtain coefficients for a corresponding weight formula defined in formulae 204. In the depicted example, container instance weight coefficient table 201 identifies a container type and values for three coefficients, $a_1$, $a_2$ and $a_3$, for variables, $x_a$, $y_a$, and $z_a$ that may be summed to yield a container instance weight, a, for the container type. As an example, the $a_1/x_a$ coefficient/variable could represent disk overhead for the container type, the $a_2/y_a$ coefficient/variable could represent the battery/power overhead for the container type and the $a_3/z_a$ coefficient/variable could represent the cost for the container type (e.g., the cost of deploying a container in the cloud as opposed to locally on computing device 100).

Application weight table 202 identifies an application type and values for two coefficients, $b_1$ and $b_2$, for variables, $x_b$ and $y_b$, that may be summed to yield an application weight, b, for the application. As an example, the $b_1/x_b$ coefficient/variable could represent RAM overhead for the application and the $b_2/y_b$ coefficient/variable could represent the battery/power overhead for the application.

Data path weight table 203 identifies a data path type and values for two coefficients, $c_1$ and $c_2$, for variables, $x_c$ and $y_c$, that may be summed to yield a data path weight, c, for the data path type. As an example, the $c_1/x_c$ coefficient/variable could represent RAM/system overhead for the data path type and the $c_2/y_c$ coefficient/variable could represent the performance per watt for the data path type.

The values of the variables may be determined dynamically while the respective container or data path is deployed. For example, management service 110 may monitor context to determine the value of such variables. In some embodiments, an administrator could define the coefficients to account for differences between container types, applications and data paths. For example, a disk parameter used to determine the value of the $x_a$ may impact performance more for a Hyper-V Win10 VM container than for a Docker software container, and therefore, the $a_1$ coefficient can enable an administrator to account for such differences in impact. In some embodiments, machine learning techniques could be used to define and/or refine the values of the coefficients over time. Any other suitable technique could be used to select which coefficients and/or values may be used to calculate or generate a weight. Also, coefficients need not be employed in each embodiment of the present invention. Likewise, in some embodiments, one or more variables may not be employed (i.e., the respective one or more coefficients may simply be added to other term(s) in the respective weight formula). Accordingly, embodiments of the present invention should not be limited to any particular way in which any of the weights are determined.

Formulae 204 may include the formulae for calculating the container instance weight, the application weight and the data path weight such as those described above. Formulae 204 may also include a per container weight formula and a per solution weight formula. The per container weight formula can be used to calculate the collective weight of a container, while the per solution weight formula can be used to calculate the collective weight of a solution. In this context, a solution can encompass dependent containers and their data paths. In some embodiments, the per container weight formula can yield a collective weight of a container by summing the container instance weight for the container type, the application weight for the application running in the container and the data path weight of each data path that is established for the container.

The per solution weight formula can yield a collective weight of a solution by summing the container instance weight for each container in the solution, the application weight for each application running in the containers in the solution and the data path weight of each data path between the containers in the solution.

In some embodiments, management server 140 may maintain tables 201-203 and formulae 204 and may use them to calculate a collective weight of a container or solution based on information provided by management service 110. In other embodiments, management server 140 may provide tables 201-203 and formulae 204 to management service 110 to enable management service 110 to calculate a collective weight of a container or solution. Accordingly, the location at which a collective weight may be calculated is not essential to the present invention.

Figure 3A:
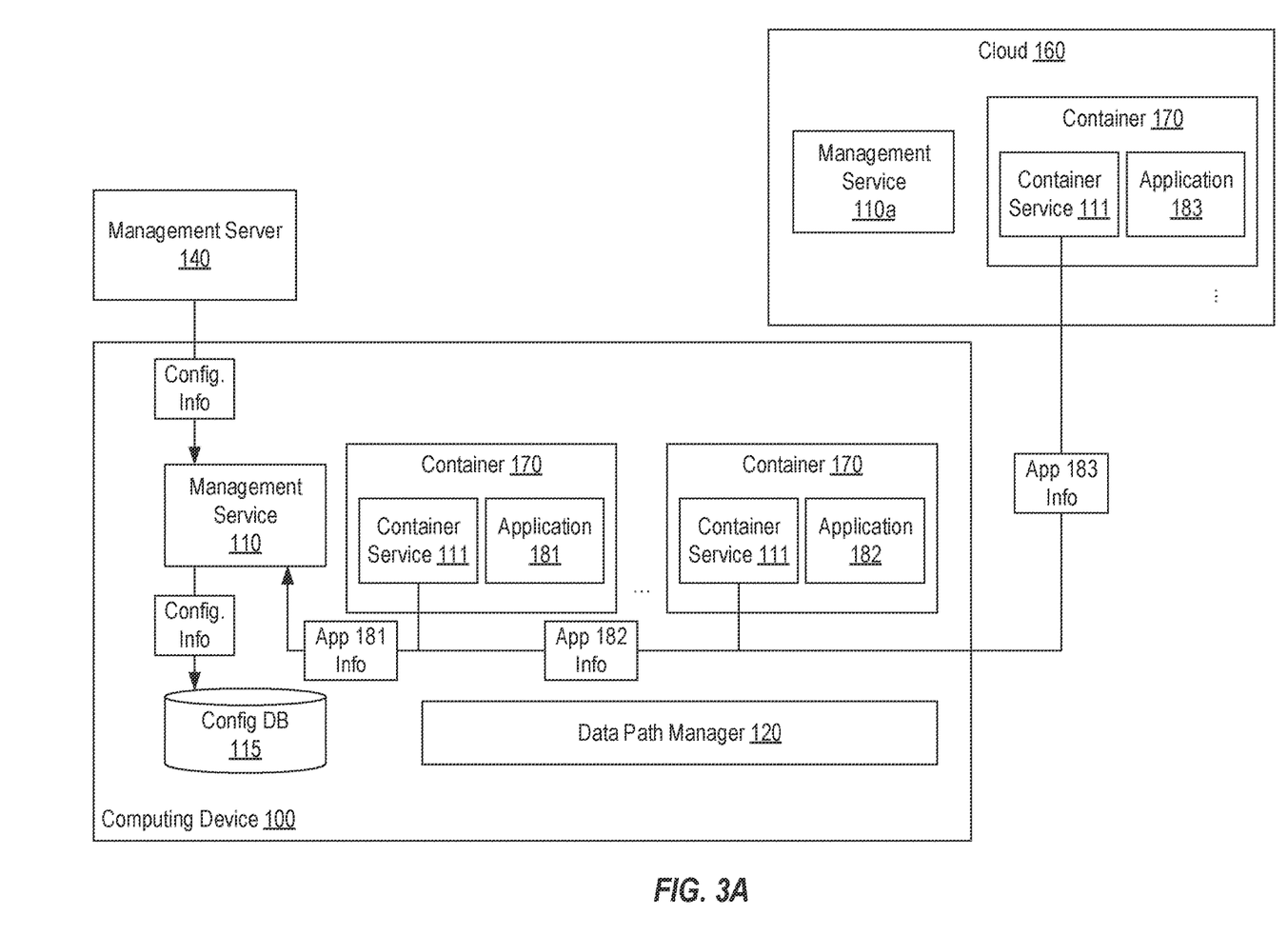
FIGS. 3A-3C provide an example of functionality that may be performed on a computing device to enable dependent containers to be managed based on context in one or more embodiments of the present invention.
Figure 3B:
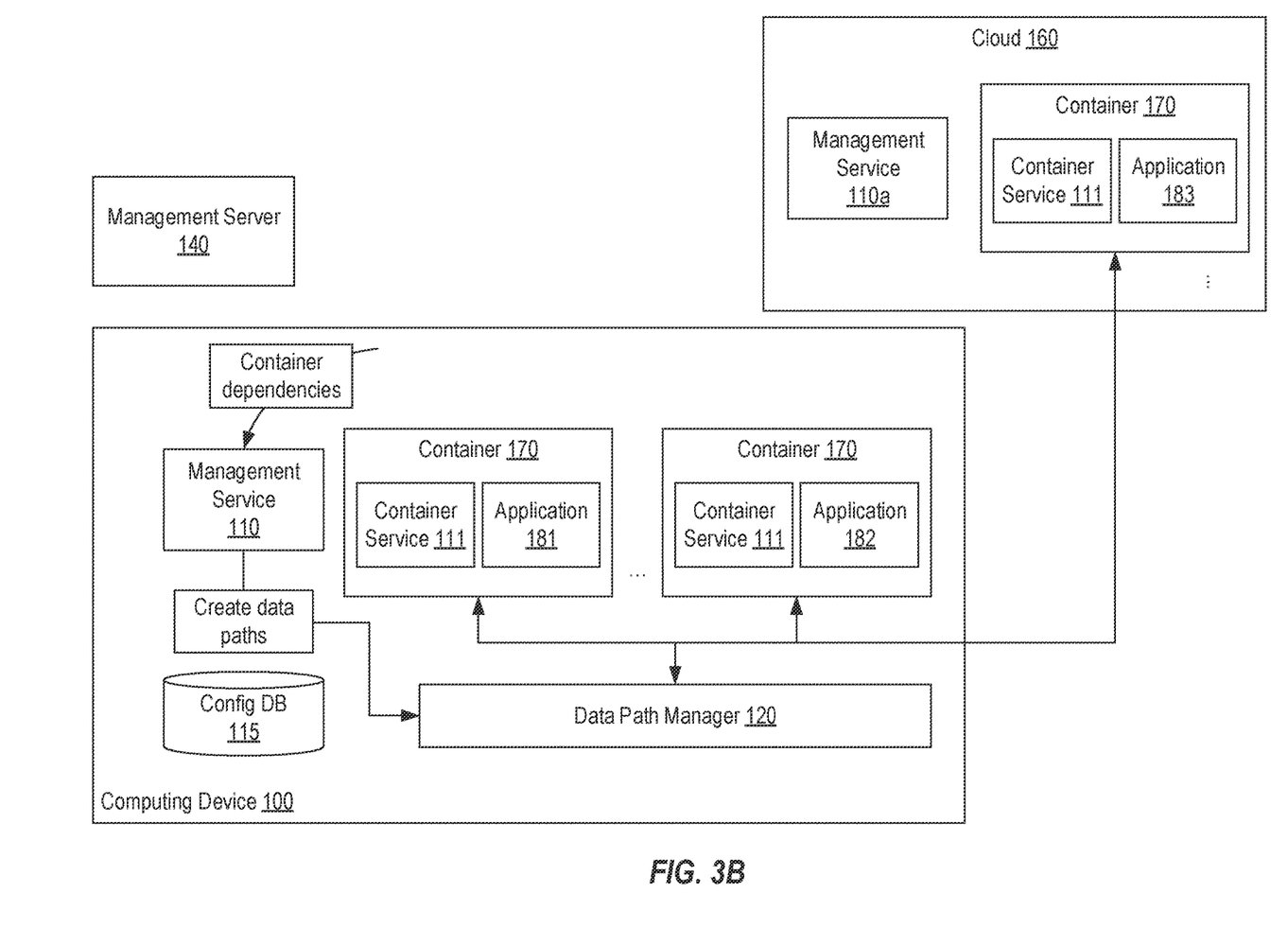
Figure 3C:
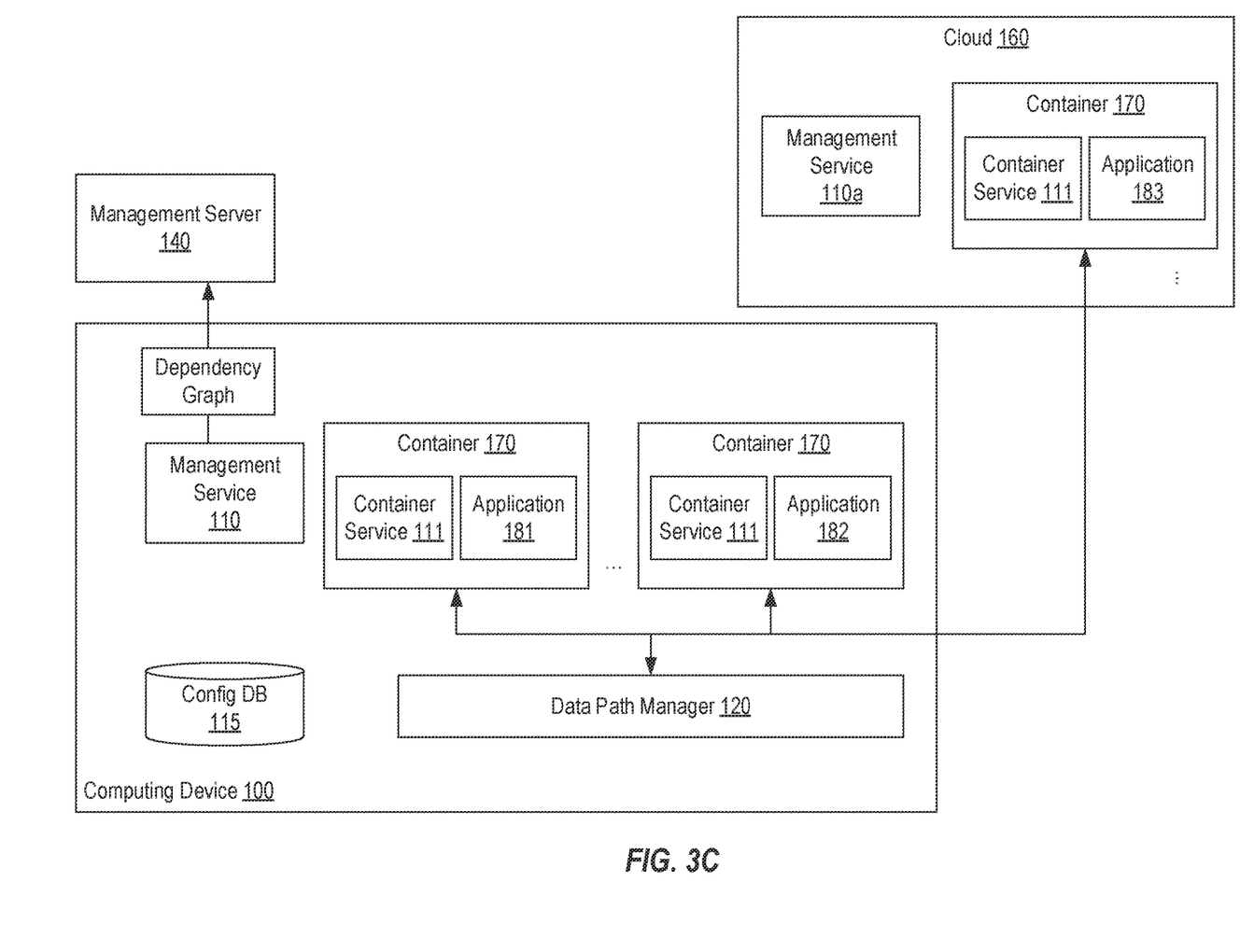

FIGS. 3A-3C provide an example of functionality that management service 110 may perform to enable it to gather context for one or more dependent container scenarios (or solutions) which context can then be used to determine a collective weight for each container involved in the dependent container scenario and a collective weight for the solution itself. FIG. 3A shows that management service 110 can receive, at any suitable time, configuration information from management server 140 and store it in configuration database 115. This configuration information could include any information that management service 110 may use to manage containers 170 and, of primary relevance to embodiments of the present invention, may include tables 201-203 and formulae 204 in some embodiments. FIG. 3A also shows that management service 110 can receive information about each application that is hosted in a container 170. For example, management service 110 could be configured to detect whenever a container 170 is launched on computing device 100 or in cloud 160 (e.g., via management service 110a) and in response could establish a session with the instance of container service 111 running in the launched container 170. Management server 110 could then receive the application info via these sessions, including initially and as the application info may be updated. Notably, in conjunction with detecting when a container 170 is launched, management service 110 can identify the container type. Also, management service 110 can use the application info to identify the application running in the respective container 170.

Turning to FIG. 3B, management service 110 may identify container dependencies and interface with data path manager 120 to create data paths based on such dependencies. The '993 Application describes examples of how management service 110 may provide this functionality. Of primary relevance to embodiments of the present invention, management service 110 can determine how one container 170 may be dependent on another container 170. More particularly, management service 110 can determine when an application in one container 170 relies on a service (or other resource) hosted in another container 170 and will know which data path(s) are established between the containers to enable the application to access the service.

Turning to FIG. 3C, management service 110 can create dependency graph(s) which identify which containers are dependent on another container and which data paths are created to connect the dependent container(s) to the other container(s). Management service 110 may store the dependency graphs and/or may share them with management server 140.

Figure 4A:
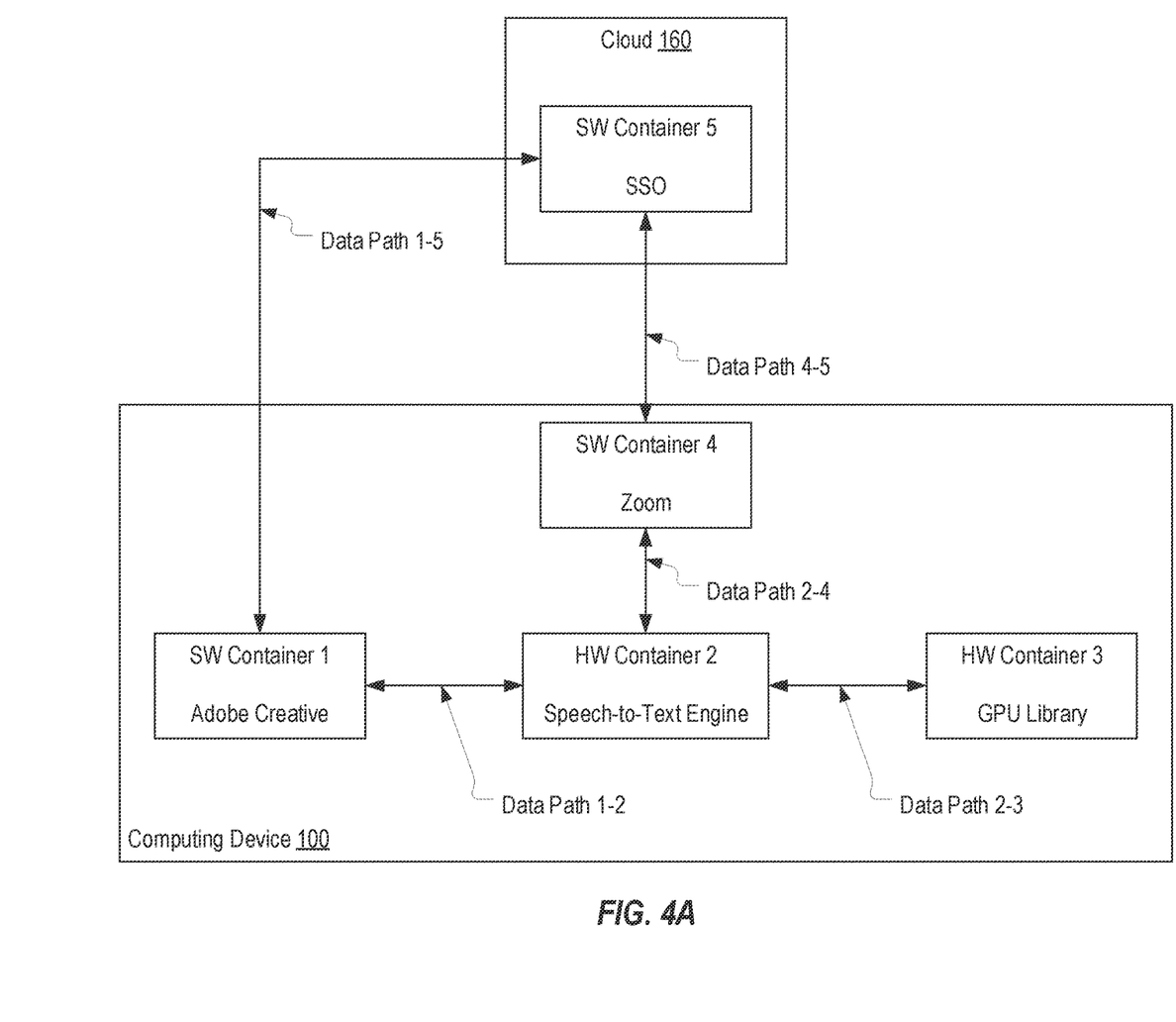
FIGS. 4A and 4B provide an example of how dependency graphs could be created in one or more embodiments of the present invention.
Figure 4B:
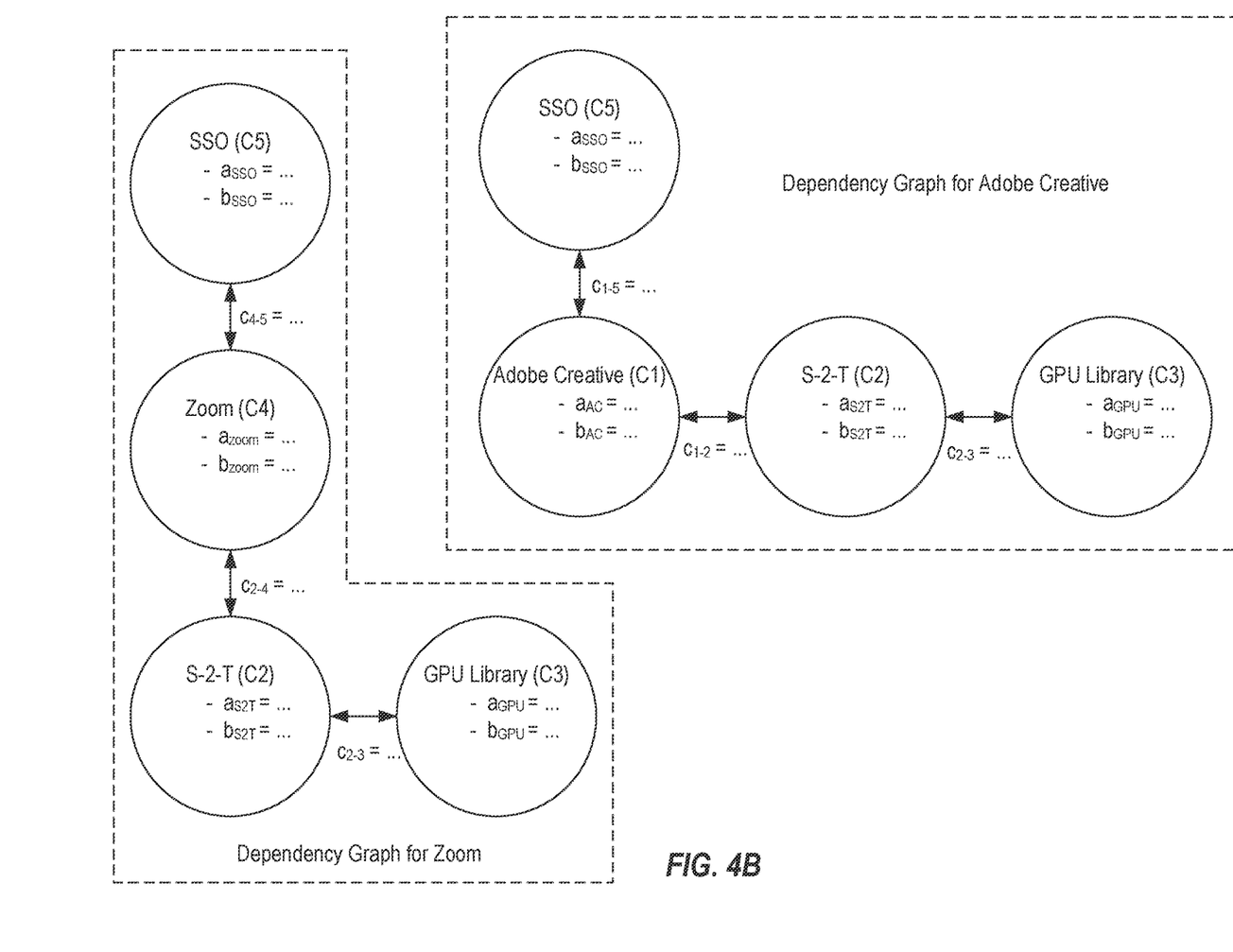

FIGS. 4A and 4B provide an example of how management service 110, possibly in conjunction with management server 140, may create/update dependency graphs. As represented in FIG. 4A, in this example, it is assumed that Adobe Creative is deployed in software container 1 on computing device 100, a speech-to-text engine is deployed in hardware container 2 on computing device 100, a GPU library is deployed in hardware container 3 on computing device 100, Zoom is deployed in software container 4 on computing device 100 and a single sign-on service (SSO) is deployed in software container 5 in cloud 160. It is also assumed that Adobe Creative uses the speech-to-text engine and SSO and therefore a data path 1-2 and a data-path 1-5 respectively have been created between the respective containers, that Zoom uses the speech-to-text engine and SSO and therefore a data path 2-4 and a data-path 4-5 respectively have been created between the respective containers, and that the speech-to-text engine uses the GPU library and therefore a data path 2-3 has been created between the respective containers. As explained above, management service 110 can gather, maintain and update such context about the containers and their data paths.

FIG. 4B represents how management service 110 could create a dependency graph for each dependent container in the example shown in FIG. 4A. For example, based on the data paths that have been established to allow Zoom to access external services, the dependency graph for Zoom links the Zoom container with the SSO container and the speech-to-text container, and also links the speech-to-text container with the GPU library container given that the speech-to-text engine uses the GPU library to fulfill Zoom's requests. The dependency graph for Zoom can also define the weights for each container and each data path which could be calculated using tables 201-203, formulae 204 and values of the variables that can be dynamically determined as the containers and data paths are monitored.

For example, if Zoom's container (C4) is a Docker software container, the container instance weight, $a_{Zoom}$, for Zoom's container, could be calculated by determining what the values of the variables $x_a$, $y_a$ and $z_a$ should be based on the container's current disk overhead, battery/power overhead and cost, multiplying these variables by the corresponding coefficients (e.g., 4, 3 and 2) and then summing the products. Similarly, since Zoom's container is hosting Zoom, the application weight, $b_{Zoom}$, for Zoom's container could be calculated by determining what the values of the variables $x_b$ and $y_b$ should be based on the application's current RAM overhead and battery/power overhead, multiplying these variables by the corresponding coefficients (e.g., 7 and 5) and then summing the products. Assuming that the data path between Zoom's container and the SSO container (C5) is network based, the data path weight, $C_{4-5}$, for this data path could be calculated by determining what the values of the variables $x_c$ and $y_c$ should be based on the data path's current RAM overhead and performance per watt, multiplying these variables by the corresponding coefficients (e.g., 7 and 4) and then summing the products.

As suggested above, in some embodiments, management service 110 may only determine the values of the variables based on its monitoring of the containers and the data paths and may then report the values of the variables to management server 240 which in turn can calculate the weights using the weight formulae. In other embodiments, management service 110 may determine the values and use the weight formulae to calculate the weights, and may then report the weights to management server 140. Of importance is that the weights can be dynamically updated based on changes that may occur in the application, the container and/or the data path.

In the remainder of the specification, it will be assumed that management service 110 is configured to calculate the container instance weights, the application weights and the data path weights and report them to management server 140. In some embodiments, management service 110 may report such weights in response to certain events such as whenever an application is migrated to a new container, whenever an application changes state within its container, whenever a data rate or bandwidth of a data path is changed, whenever the data path between containers is changed (e.g., when a different data path is established), or any other event or condition that may cause any of the weights to change.

Figure 5A:
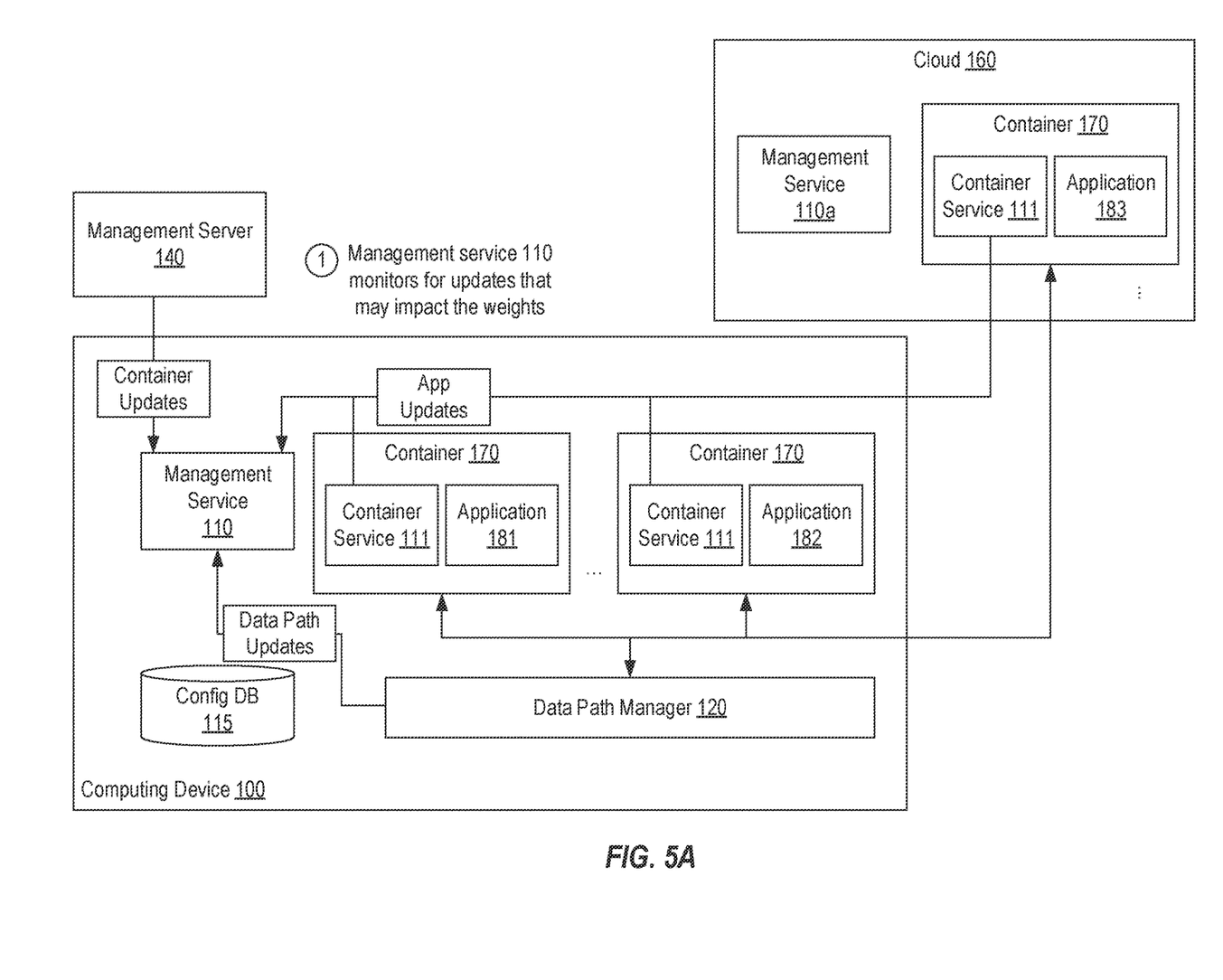
FIGS. 5A-5D provide an example of how a dependent container may be managed in one or more embodiments of the present invention.

FIGS. 5A-5D provide an example of how container instance weights, application weights and data path weights may be determined and used to manage a dependent container in accordance with one or more embodiments of the present invention. Turning to FIG. 5A, in step 1, management service 110 can monitor for updates that may impact the container instance weights, the application weights and the data path weights. For example, management service 110 could receive container updates from management server 140 whenever a container 170 is deployed to or made available on computing device 100, application updates from container service 111 running in each container 170 whenever an application changes states or to report performance of the application or the container, data path updates from data path manager 120 whenever a data path is created or updated or to report performance of the data path, etc. Such updates could provide information by which management service 110 could calculate the weights such as the type of a container, information for determining a container's disk overhead, battery/power overhead and cost, the identity of an application, information for determining an application's RAM overhead and battery/power overhead, a type of a data path established for each container, information for determining the data path's RAM/system overhead and performance per watt, etc. Accordingly, step 1 can represent an ongoing process that management service 110 may perform to ensure that the weights it calculates accurately reflect the current containerized environment.

Figure 5B:
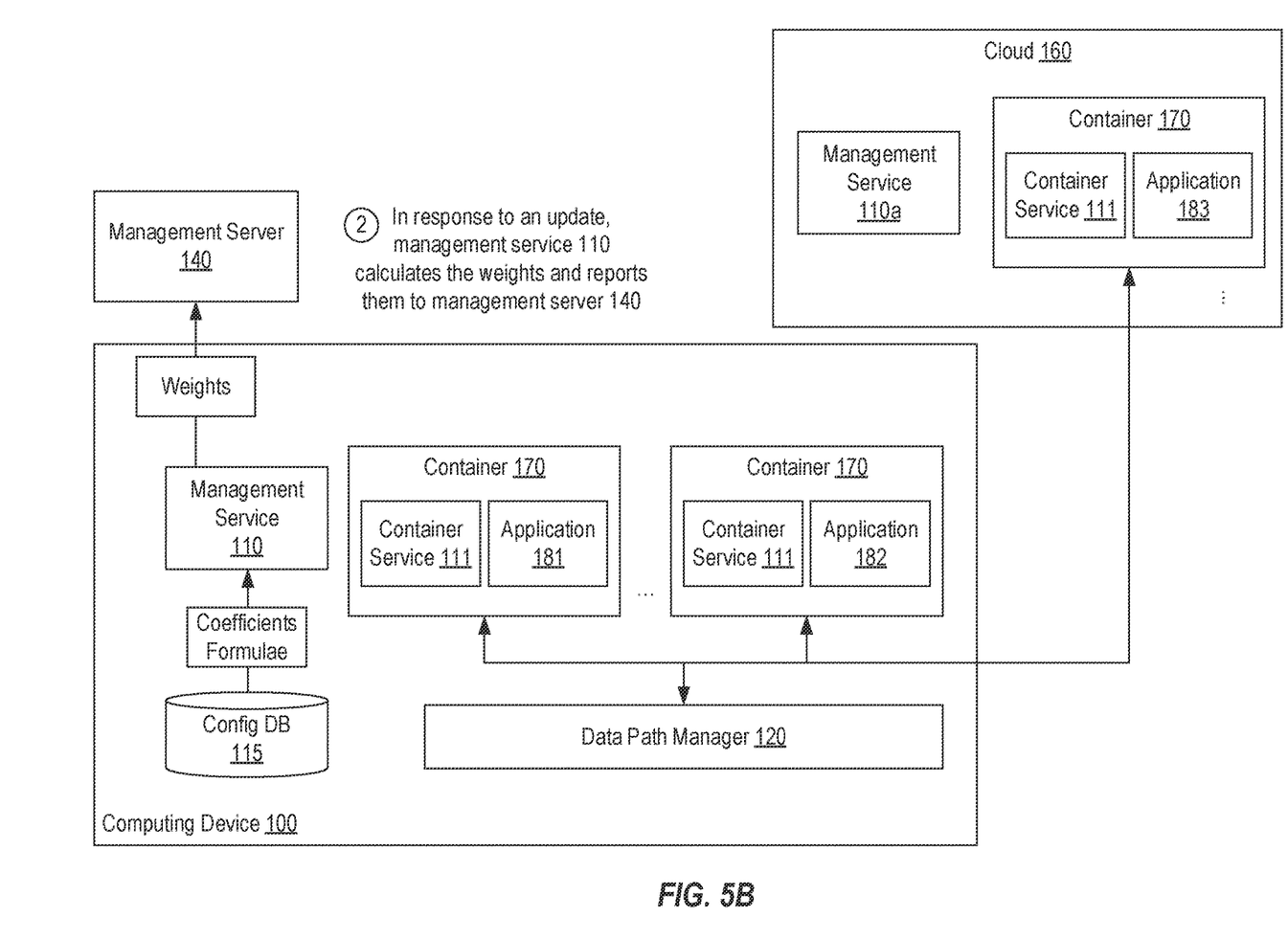

Turning to FIG. 5B, in step 2, which may be performed in response to receiving an update as part of step 1, periodically or at any other suitable time, management service 110 can calculate the container instance weights, application weights and data path weights for all dependent containers on or accessible to computing device 100 (e.g., all containers and data paths defined in the dependency graphs) and report them to management server 140. As represented, management service 110 may use the coefficients defined in tables 201-203 and formulae 204 to perform the calculations.

Figure 5C:
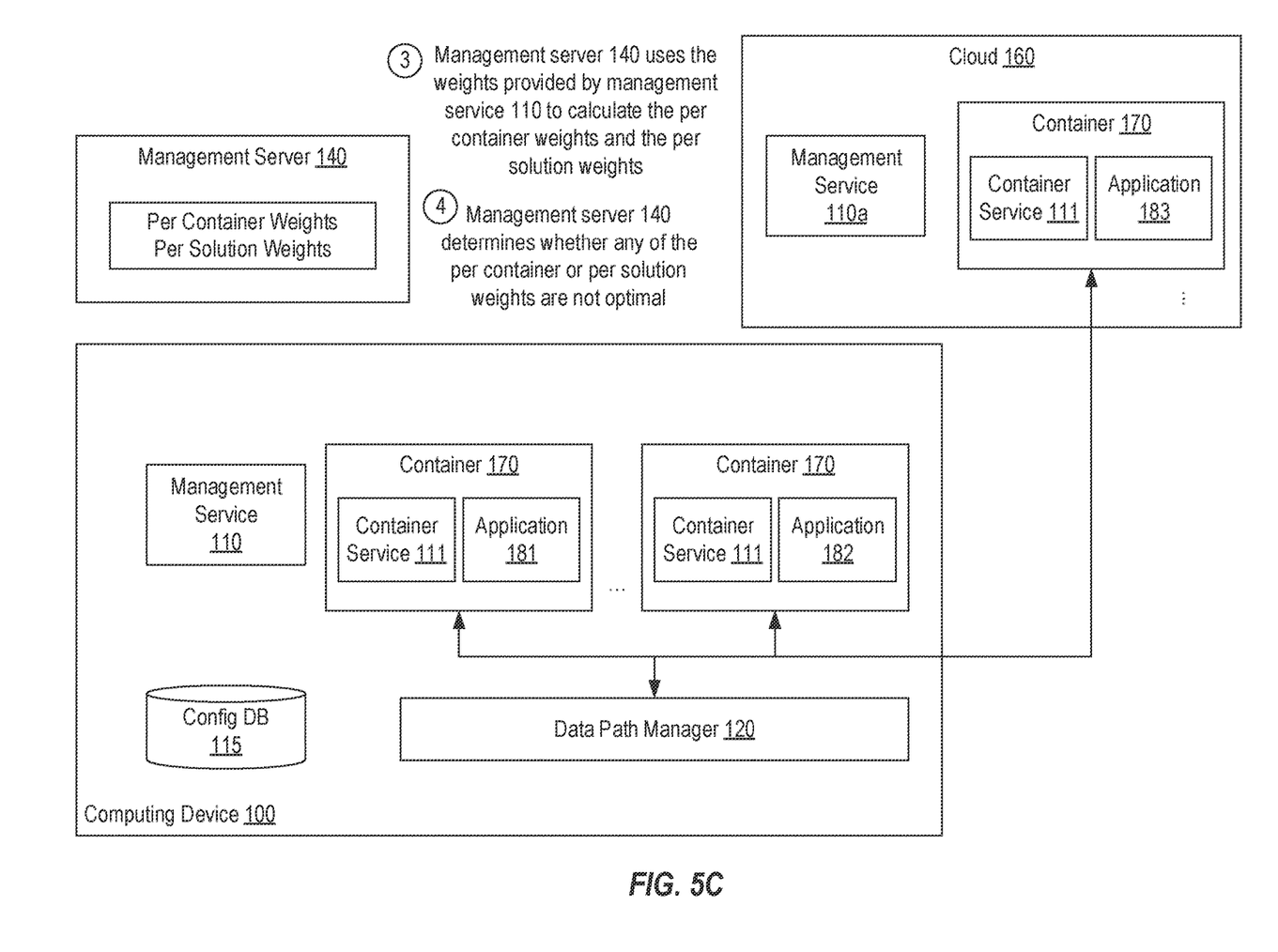

Turning to FIG. 5C, in step 3, management server 140 can use the container instance weights, application weights and data path weights it receives from management service 110 to calculate the per container weights and the per solution weights for each dependent container and solution on or accessible to computing device 100 (e.g., using the dependency graphs).

With reference to FIG. 4B, management server 140 could calculate the per container weight for Zoom's container by summing the container instance weight for Zoom's container, the application weight for Zoom and the data path weights for data paths $C_{4-5}$, $C_{2-4}$ and $C_{2-3}$.

Also with reference to FIG. 4B, management server 140 could calculate the per solution weight for Zoom by summing the container instance weights of the containers for Zoom, SSO, the speech-to-text engine and the GPU library, the application weights for these applications/services and the data path weights for the data paths between these containers. Although not represented separately in FIG. 4B, there could also be a dependency graph for the speech-to-text engine that defines the dependence of the Zoom and Adobe Creative containers on the speech-to-text engine container and its dependence on the GPU library container. Therefore, management server 140 could calculate a per solution weight for the speech-to-text engine based on such a dependency graph.

In step 4, management server 140 can determine whether any of the per container or per solution weights represent that a container type and/or location is not optimal for a particular application or service. For example, in some embodiments, management server 140 may maintain thresholds for the per container and per solution weights. If a per container or per solution weight exceeds the respective threshold, management server 140 may determine that the container type and/or location of the container or of a container in the solution is not optimal for the corresponding application or service. As another example, in some embodiments, management server 140 may determine whether a per container weight or per solution weight would be reduced if an application or service were migrated to a different container, and if so, can determine that the current container or solution is not optimal. Accordingly, there are a variety of techniques that management server 140 may use to determine when a per container weight or a per solution weight represents that a current container type and/or location is not optimal.

Figure 5D:
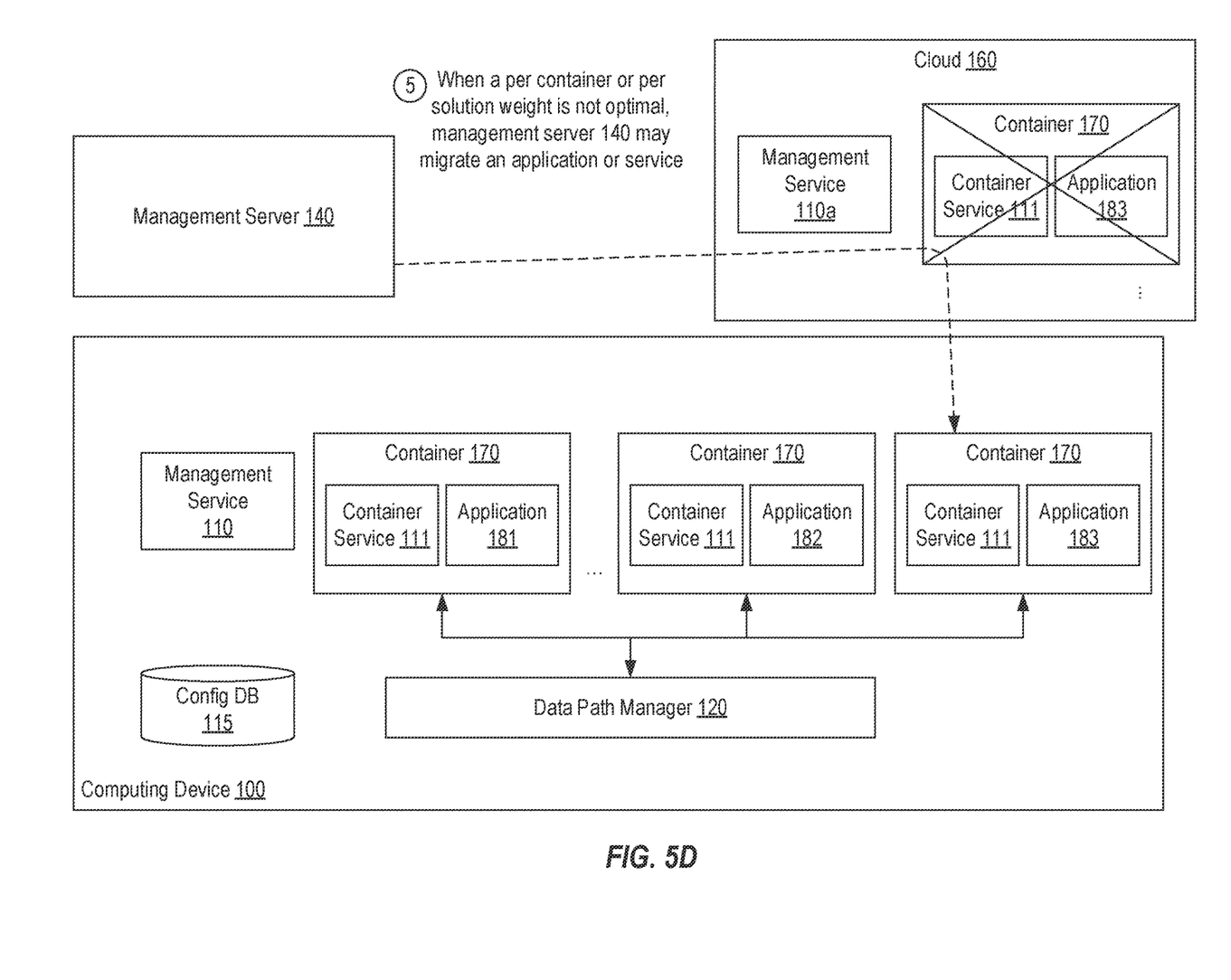

Turning to FIG. 5D, in step 5, management server 140 may migrate an application or service when it determines that the per container weight or per solution weight represents a non-optimal container type and/or location for the application or service. In some embodiments, management server 140 may automatically perform such migrations, while in other embodiments, management server 140 may prompt an administrator or other individual to perform the migrations. As an example, in FIG. 5D, management server 140 is shown as migrating application 183 from a cloud container to a container on computing device 100. As another example, management server 140 could migrate an application from a hardware container to a software container or from one type of software container to another type of software container. As another example, management server 140 could migrate a service in a solution from one type and/or location of container to another so that the data paths with the dependent containers will be more optimal. Accordingly, there are a variety of ways in which management server 140 may attempt to optimize a dependent container. After performing step 5, the process represented in FIGS. 5A-5D could be repeated to ensure that any migrations resulted in optimal performance, and if not, to attempt another migration that may be optimal.

Additional examples will now be given of how embodiments of the present invention may be used to manage and optimize a dependent container based on context. A scenario may exist in which a video editing application is hosted in a cloud container and is dependent on a GPU library hosted in a software container on a computing device. In such a case, a network-based data path may be established between these two containers. The video editing application and the GPU library will use the data path to transfer large data bursts. As long as network bandwidth is adequate, this container arrangement may be optimal. However, if network bandwidth becomes congested, the data path weight may cause the per container weight for the video editing software to become non-optimal. In such a case, management server 140 could determine that it would be most optimal to migrate the video editing application to a local container. The management server 140 could consider the local resources in selecting whether to migrate the video editing application to a software container or a hardware container (e.g., by calculating what the per container weight would be if the video editing application were deployed in a software container or a hardware container or in other words considering the impact of the container instance weight in the decision).

With reference to FIG. 4B, a scenario may exist in which the container type and/or location of Zoom or the speech-to-text engine is selected due to the user's active use of Zoom's live transcription feature and such selection may cost more (e.g., by using a cloud container which requires payment of a per-use fee). However, the benefits of a data path that is enabled by the container selection may outweigh the added cost (e.g., as dictated by the per container weight or per solution weight). However, the user may turn off live transcription and as a result, management service 110 could detect that the per container weight or per solution weight has changed (e.g., due to data path usage being significantly reduced). Management server 140 could then detect from the per container or per solution weight that it may be more optimal to migrate Zoom or the speech-to-text engine to a different container (e.g., a container that may not enable a data path with high data speeds but that is less costly).

As another example, one application hosted in a container on a computing device may depend on a service hosted in a cloud container. Then, another application may be deployed in a container on the computing device and may depend on the same service. In such a case, the per solution weight may be heavily influenced by the data path weights for the two containers and may suggest that it would be more optimal to migrate the shared service to a container on the computing device.

As can be seen, embodiments of the present invention can be implemented to manage dependent containers to ensure optimal performance in view of a variety of context. By implementing embodiments of the present invention, an administrator will not need to constantly monitor performance of containerized applications or solutions to ensure that pre-configured settings are providing optimal performance. Instead, context can be monitored and used to dynamically determine whether the current container type and/or location is optimal for any given application, service or solution.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing dependent containers based on context, the method comprising:
    while an application is deployed in a first container, determining that the application is dependent on a first service that is hosted in a second container such that the application accesses the first service via a first data path established between the first and second containers;
    in response to determining that the application deployed in the first container is dependent on the first service hosted in the second container, gathering context about the application, the first container and the first data path;
    using the context to calculate a container instance weight, an application weight and a data path weight, wherein the container instance weight is calculated based on a container type of the first container using multiple container instance weight coefficients, wherein the application weight is calculated based on an identity of the application using multiple application weight coefficients, and wherein the data path weight is calculated based on a data path type of the first data path using multiple data path weight coefficients;
    using the container instance weight, the application weight and the data path weight to calculate a per container weight for the first container;
    based on the per container weight for the first container, determining that the first container is not optimal for the application in view of the application's dependency on the first service hosted in the second container; and
    deploying the application in a different container rather than in the first container to thereby cause the application to access the first service via a second data path established between the different container and the second container.

2. The method of claim 1, wherein the context about the application comprises one or more of a RAM overhead or a battery or power overhead.

3. The method of claim 1, wherein the context about the first container comprises one or more of a disk overhead of the first container, a battery or power overhead of the first container or a cost of the first container.

4. The method of claim 1, wherein the context about the first data paths comprises a RAM or system overhead of the first data path or a performance per watt of the first data path.

5. The method of claim 1, wherein using the container instance weight, the application weight and the data path weight to calculate the per container weight for the first container comprises combining the container instance weight, the application weight and the data path weight.

6. The method of claim 1, wherein the different container is a different type of container.

7. The method of claim 1, wherein the different container is in a different location.

8. The method of claim 1, further comprising:
    while the application is deployed in the different container, gathering updated context about the application, the different container and the second data path;
    using the updated context to calculate the one or more weights;
    while a second application is deployed in a third container, gathering additional context about the second application, the third container and a third data path established between the second container and the third container by which the second application accesses the service hosted in the second container;
    using the additional context to calculate one or more additional weights;
    using the one or more weights and the one or more additional weights to calculate a per solution weight; and
    based on the per solution weight, migrating the application, the second application or the service to a new container.

9. The method of claim 8, wherein the one or more weights comprise a container instance weight for the first container, an application weight for the application and a data path weight for the first data; and
  wherein the one or more additional weights comprise a container instance weight for the third container, an application weight for the second application and a data path weight for the third data path.

10. One or more computer storage media storing computer executable instructions which when executed implement a method for managing dependent containers based on a context, the method comprising:
  while an application is deployed in a first container, determining that the application is dependent on a first service that is hosted in a second container such that the application accesses the first service via a first data path established between the first and second containers;
  in response to determining that the application deployed in the first container is dependent on the first service hosted in the second container, gathering context about the application, the first container and the first data path;
  using the context to calculate a container instance weight, an application weight and a data path weight, wherein the container instance weight is calculated based on a container type of the first container using multiple container instance weight coefficients, wherein the application weight is calculated based on an identity of the application using multiple application weight coefficients, and wherein the data path weight is calculated based on a data path type of the first data path using multiple data path weight coefficients;
  using the container instance weight, the application weight and the data path weight to calculate a per container weight for the first container;
  based on the per container weight for the first container, determining that the first container is not optimal for the application in view of the application's dependency on the first service hosted in the second container; and
  deploying the application in a different container rather than in the first container to thereby cause the application to access the first service via a second data path established between the different container and the second container.

11. The computer storage media of claim 10, wherein the different container has a different type or location from the first container.

12. The computer storage media of claim 10, wherein the method further comprises:
  while the application is deployed in the different container, gathering updated context about the application, the different container and the second data path;
  using the updated context to calculate the one or more weights;
  while a second application is deployed in a third container, gathering additional context about the second application, the third container and a third data path established between the second container and the third container by which the second application accesses the service hosted in the second container;
  using the additional context to calculate one or more additional weights;
  using the one or more weights and the one or more additional weights to calculate a per solution weight; and
  based on the per solution weight, migrating the application, the second application or the service to a new container.

13. A method for managing dependent containers based on context, the method comprising:
  while an application is deployed in a first container, determining that the application is dependent on a first service that is hosted in a second container such that the application accesses the first service via a first data path established between the first and second containers;
  in response to determining that the application deployed in the first container is dependent on the first service hosted in the second container, gathering context about the application, the first container and the first data path;
  using the context to calculate a container instance weight, an application weight and a data path weight, wherein the container instance weight is calculated based on a container type of the first container using multiple container instance weight coefficients, wherein the application weight is calculated based on an identity of the application using multiple application weight coefficients, and wherein the data path weight is calculated based on a data path type of the first data path using multiple data path weight coefficients;
  using the container instance weight, the application weight and the data path weight to calculate a per container weight for the first container;
  based on the per container weight for the first container, determining that the first container is not optimal for the application in view of the application's dependency on the first service hosted in the second container;
  deploying the application in a different container rather than in the first container to thereby cause the application to access the first service via a second data path established between the different container and the second container;
  while the application is deployed in the different container, gathering updated context about the application, the different container and the second data path;
  using the updated context to calculate the one or more weights;
  while a second application is deployed in a third container, gathering additional context about the second application, the third container and a third data path established between the second container and the third container by which the second application accesses the service hosted in the second container;
  using the additional context to calculate one or more additional weights;
  using the one or more weights and the one or more additional weights to calculate a per solution weight; and
  based on the per solution weight, migrating the application, the second application or the service to a new container.

14. The method of claim 13, wherein the context about the first data path comprises a RAM or system overhead or a performance per watt of the first data path established between the first and second containers via which the application accesses the first service; and
  wherein the context about the second data path comprises a RAM or system overhead or a performance per watt of the second data path established between the second and third containers via which the second application accesses the first service.

* * * * *